Dec. 25, 1962 C. G. EILERS 3,070,662

DUAL CHANNEL FREQUENCY-MODULATION RECEIVER

Filed July 31, 1961 2 Sheets-Sheet 1

INVENTOR.
Carl G. Eilers
BY Francis W. Crotty
Atty.

Dec. 25, 1962 C. G. EILERS 3,070,662

DUAL CHANNEL FREQUENCY-MODULATION RECEIVER

Filed July 31, 1961 2 Sheets-Sheet 2

INVENTOR.
Carl G. Eilers
BY Francis W. Crotty
Atty.

United States Patent Office 3,070,662

Patented Dec. 25, 1962

3,070,662

DUAL CHANNEL FREQUENCY-MODULATION RECEIVER

Carl G. Eilers, Oak Park, Ill., assignor to Zenith Radio Corporation, a corporation of Delaware Filed July 31, 1961, Ser. No. 128,121
9 Claims. (Cl. 179—15)

Figure 1:
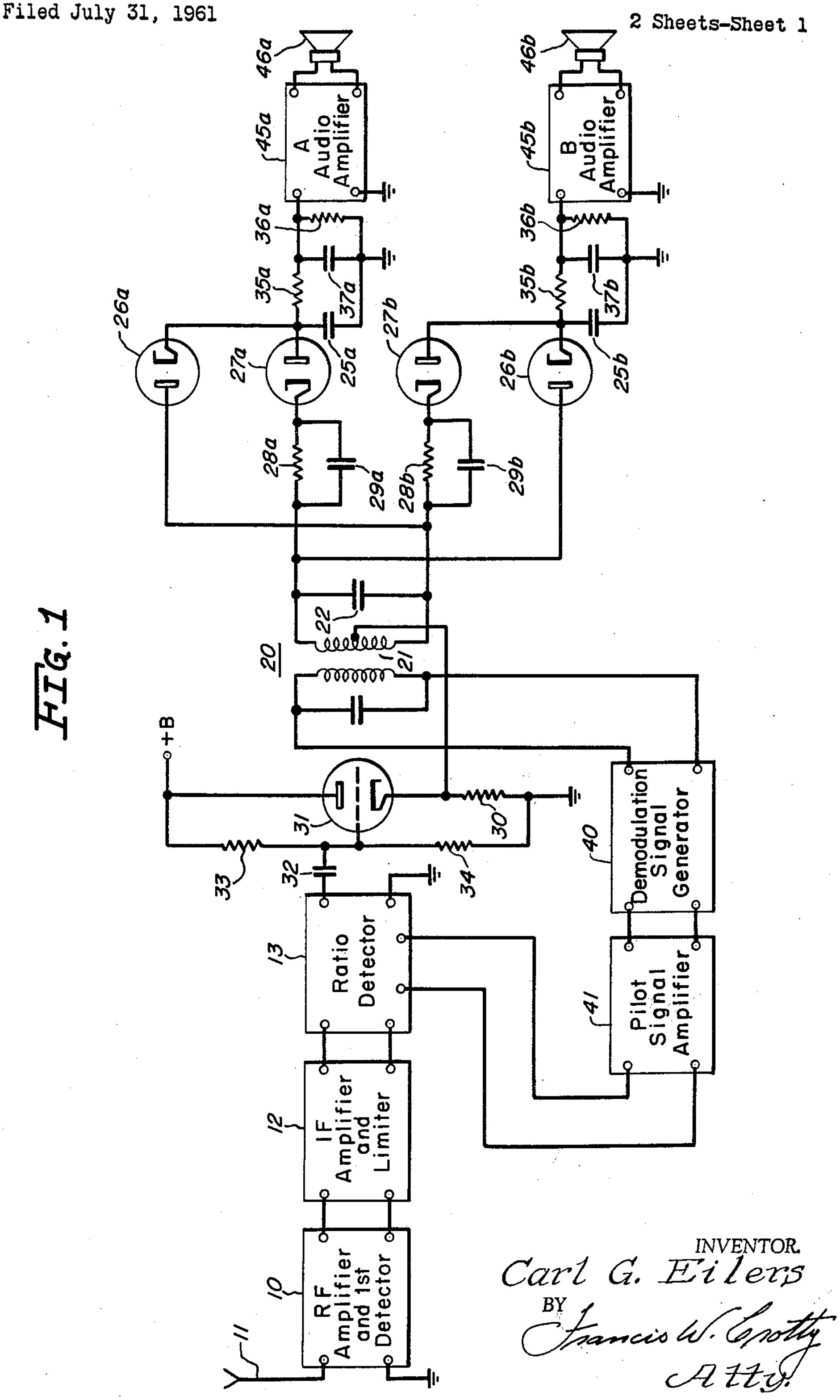

The present invention is directed to the structure of a frequency-modulation receiver that may be employed in the reception of monophonic or stereophonic broadcast programs. The receiver is particularly useful in connection with frequency-modulation stereophonic broadcasts conforming to standards recently adopted by the Federal Communications Commission.

The composition of the program signal, methods for its generation and general considerations of interest to the receiver are described in a copending application of Robert Adler et al., Serial No. 22,926, filed April 18, 1960, and assigned to the same assignee as the present invention. Since the present disclosure concerns itself with structural details of the receiver, it is not necessary to dwell on the mechanism of the transmitter so long as there is sufficient understanding of the nature of the transmission.

The transmitted signal is a carrier which is frequency-modulated in accordance with the following modulation function:

$$M(t)=K_1(A+B)+K_1(A-B)S+K_2S' \qquad (1)$$

where A and B are the audio signals sometimes referred to as the left and right channels. Accordingly, the first term of Equation 1 is the sum of these two signals and, since it is a direct modulation of the carrier, the system is compatible in that a monophonic receiver may respond to this component of the composite modulation to achieve monaural reproduction.

The second term of the modulation function represents the fundamental modulation components, that is, the modulation components associated with the fundamental of a suppressed-carrier amplitude-modulated subcarrier conveying the difference information. Since the difference information is conveyed by suppressed-carrier techniques, a pilot signal is also included in the transmission to synchronize the receivers to the transmitter. The pilot signal S′ is represented by the third term of the modulation function and, as prescribed by the standards of the Federal Communications Commission, is a signal at half the frequency of the suppressed-carrier amplitude-modulated subcarrier. Of course $K_1$ and $K_2$ are constants.

One attractive form of receiver for utilizing this transmission is described and claimed in a copending application of Adrian J. De Vries, Serial No. 118,009, filed June 19, 1961, and likewise assigned to the assignee of the present invention. The De Vries receiver not only responds to the stereophonic signal to derive separated A and B audio signals for energizing suitably spaced sound reproducers but is also equally capable of responding to a conventional monophonic frequency-modulation transmission. Moreover, the De Vries receiver adjusts itself for monophonic or stereophonic reproduction in accordance with the character of the received transmission without requiring any manipulation on the part of the user. This attractive attribute of the De Vries receiver is also realized with the structure to be described herein.

The De Vries receiver features a synchronous detector which may make use of a pair of averaging diode detectors and it may be shown that the load circuit of one detector derives predominantly the A signal while the load circuit of the other detector derives predominantly the B signal. Each load circuit, however, has a contribution from the other channel and the effect of this contribution is obviated by matrixing. The receiver of the present invention permits separated A and B audio to be obtained directly from the composite modulation without the need for matrixing.

Accordingly, it is an object of the invention to provide a novel receiver for a stereophonic frequency-modulation broadcast system.

It is a specific object of the invention to provide a novel receiver structure for responding to a frequency-modulation stereophonic broadcast, conforming to the specifications of the Federal Communications Commission, to derive separated stereophonic signals directly from a signal which represents the composite modulation of the received carrier.

A further particular object of the invention is the provision of a novel frequency-modulation receiver for deriving separated program signals from a received frequency-modulation stereophonic broadcast without requiring matrixing of detected program information.

A receiver, constructed in accordance with the invention, may be utilized in a stereophonic frequency-modulation broadcast system in which the transmitted signal comprises a carrier frequency-modulated in accordance with a modulation function of the form:

$$M(t)=K_1(A+B)+K_1(A-B)S \qquad (2)$$

where A and B are audio signals, S represents the fundamental modulation components of a suppressed-carrier amplitude-modulated subcarrier signal and $K_1$ is a constant. Structurally, the receiver comprises a frequency-modulation detector and input means for applying the received signal to the detector to develop a composite signal corresponding to the aforesaid modulation function. The structure further comprises a synchronous detector including a pair of push-pull arranged channels for respectively deriving the A and B audio signals directly from the composite signal. Each such channel has a demodulation signal source, a sampling capacitor, and a pair of peak detectors preferably connected with opposed polarity to one terminal of the sampling capacitor and respectively connecting the capacitor to opposite terminals of the demodulation signal source. Further, each of these channels comprises means including the peak detectors for providing a bidirectional charging circuit for the sampling capacitor having a time constant short compared with the conductive intervals of the peak detectors. There is a conductive network in shunt with the sampling capacitor to define therewith a time constant that is long relative to the charging constant. The receiver additionally has means for controlling the demodulation signal source to supply a demodulation signal having a frequency corresponding to the fundamental of the subcarrier signal, having peak portions occurring in time phase with peaks of the subcarrier signal and having an amplitude large compared with the amplitude of the composite signal. Means are provided for applying the composite signal to the two channels in push-push relation and further means are provided for deriving the A and B audio signals from the sampling capacitors of the two channels, respectively.

Figure 2:
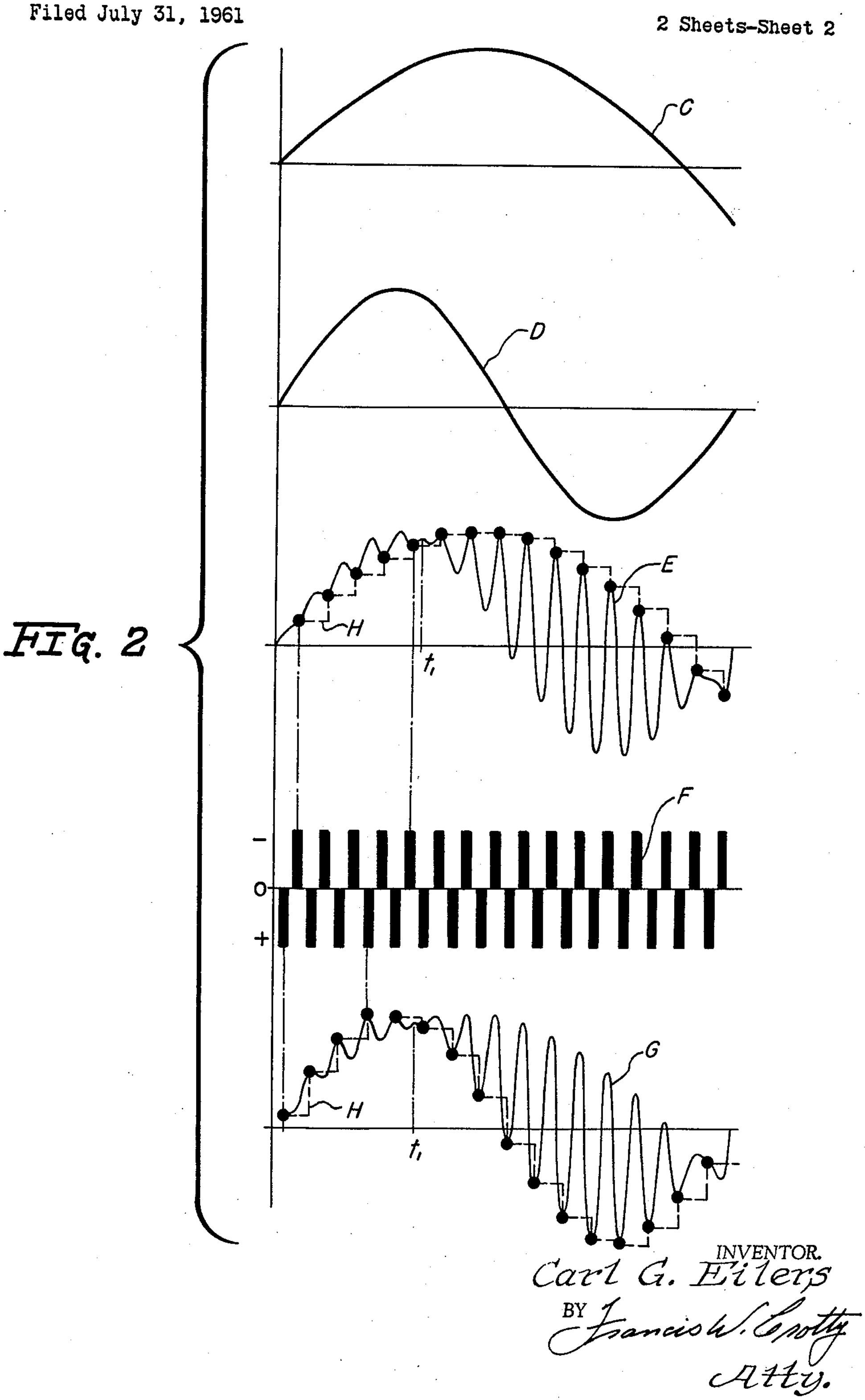

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is a schematic representation of a frequency modulation receiver embodying the present invention; and FIGURE 2 comprises a series of curves utilized in explaining certain operating features of the receiver.

Referring now more particularly to FIGURE 1, the receiver there represented may be employed for monophonic or stereophonic frequency-modulation reception and it adjusts itself, as between these two possible modes of operation, automatically in accordance with the character of the received program signal. In presenting the structure and operation of this receiver, it is convenient first to consider its use in the reception of a stereophonic frequency-modulation broadcast of the type transmitted by the apparatus of the above-identified Adler et al. application.

As explained above, the stereophonic frequency modulation broadcast system utilizing a transmitter of the type described in the Adler et al. application, transmits a signal comprising a carrier frequency modulated in accordance with the modulation function of Equation 1. Since the pilot signal, the third term of Equation 1, is utilized solely for synchronizing purposes, constant $K_1$ is an order of magnitude larger than constant $K_2$ so that only a small portion, perhaps 10% of the total deviation, is devoted to the transmission of the pilot signal. It is, of course, advantageous to devote as much of the total permissible deviation to program information as possible.

The receiver of FIGURE 1 for utilizing such a transmission comprises circuitry which, at least up to the first signal detector, is conventional. It includes a radio-frequency amplifier of any desired number of stages and a heterodyne stage or first detector, both of which are intended to be included within the block representation 10. The input of the amplifying portion connects with a wave signal antenna 11 and the output of block 10 connects with a unit 12 which will be understood to include any desired number of stages of intermediate-frequency amplification and one or more amplitude limiters. While the stages of the receiver mentioned thus far are of known construction, it is appropriate to comment on certain characteristics of the receiver which are to be superior to those normally found in conventional monophonic FM receivers.

In particular, it is preferred that the receiver have a high sensitivity so that the signal-to-noise ratio particularly in a stereophonic operation will be acceptable in fringe areas. Both automatic gain control for the RF and IF stages and automatic frequency control for the heterodyne oscillator are desirable and may be considered to be included in the block showing. The intermediate-frequency bandwidth of the usual monaural FM receiver is between 150–180 kc. in width at the −6 decibel point but the bandwidth for the receiver under consideration should be wider to prevent intermodulation or cross talk of the several services that may be simultaneously accommodated in the single radiation. As pointed out in the Adler et al. application, for example, a second subcarrier may be radiated from the transmitter to practice storecasting or background functions and, so long as the specifications of the Federal Communications Commission are adhered to, this additional service may be conducted concurrently with stereophonic or monophonic radio broadcasting with substantially no mutual interference. An IF bandwidth of 230 kc. is adequate if automatic gain control maintains the level of signal through the RF and IF amplifiers at a substantially constant value in spite of variations in intensity of the received signal.

Following the IF and limiter stage 12 is a frequency modulation detector 13 which is responsive to the amplitude limited intermediate-frequency signal for developing a composite signal corresponding to the modulation function of the received carrier. Since effective amplitude limiting is highly desirable in the receiver, unit 13 may be a ratio detector which enhances the limiting properties of the receiver. Stages 10 and 12 which precede the ratio detector comprise input means for applying the received carrier signal to the detector to develop a composite signal corresponding to the modulation function of the received carrier by a conventional process of detection.

Following the ratio detector is a synchronous detector including a pair of push-pull arranged channels for respectively deriving the A and B audio signals directly from the composite signal obtained from the ratio detector. These channels are identical as to structure so that only one need be described. For convenience, the A channel will be described and the corresponding parts of the B channel have the same reference numeral but with a subscript *b* rather than the subscript *a* except as to any part which is common to both channels and, therefore, has neither subscript.

Each channel comprises a demodulation signal source which may be a signal generator as such or an input circuit to which an external signal source is coupled, the latter expedient being shown in the drawing where the input circuit to the channels is the secondary of a double-tuned transformer 20. This secondary has an inductor 21 and a capacitor 22 which tunes the inductor to be resonant at the frequency of the subcarrier signal conveying the difference information of the stereophonic program. There is also a sampling capacitor $25_a$ and a pair of peak detectors connected with opposed polarity to one terminal of the sampling capacitor and respectively connecting that capacitor to opposite terminals of input circuit 21, 22. Although triodes may be utilized as gated peak detectors, it is convenient to employ diode detectors as shown. One of the diodes $26_a$ has its cathode connected to the high potential terminal of sampling capacitor $25_a$ while the other diode $27_a$ has its anode connected to that terminal of the sampling capacitor. The anode of diode $26_a$ connects to one terminal of input circuit 21, 22 and the cathode of diode $27_a$ connects to the opposite terminal of the input circuit through a time constant circuit comprising a resistor $28_a$ and a capacitor $29_a$. As is characteristic of a peak detector, the time constant provided by network $28_a$, $29_a$ is long compared with the period of the subcarrier frequency so that the diode may be rendered conductive only during the peak portion of a controlling or switching demodulation signal to be described hereafter.

In order that sampling capacitor $25_a$ may derive the A audio signal directly from the composite signal obtained from ratio detector 13, there are means for providing a bidirectional charging circuit for the sampling capacitor having a time constant that is short compared with the conductive intervals of the peak detectors. One of the charging circuits may be traced from the high potential terminal of sampling capacitor $25_a$, through diode $27_a$, through time constant network $28_a$ and $29_a$, to a center tap of inductor 21 and then through a conductive connection which extends to the high potential terminal of a resistor 30 having its opposite terminal likewise connected to ground. Since that circuit includes a unilaterally conductive diode $27_a$ it provides a circuit for charging capacitor $25_a$ in one direction or one sense. The circuit for charging the capacitor in the opposite sense is essentially the same except that from the high potential terminal of capacitor $25_a$ it extends through diode $26_a$ rather than diode $27_a$. It is likewise a unilaterally conductive circuit but its diode is poled oppositely to the diode of the first described charging circuit.

The described charging circuits are rendered effective by a demodulation signal applied to input circuit 21, 22 from a demodulation signal generator 40. It is essential that the demodulation signal have a frequency corresponding to that of the fundamental or carrier of a suppressed-carrier-modulated subcarrier signal conveying the difference information and it is further essential that the demodulation signal have peak portions occurring in time phase with the peaks of the subcarrier signal. This necessary phase relation may be established in a variety of ways including an automatic phase control system of well known form which may be coupled on the one hand to generator 40 and on the other to a pilot signal amplifier 41 which is coupled to ratio detector 13 to extract only the pilot signal from the output circuit of the ratio detector. Alternatively, pilot signal amplifier 41 may supply the amplified pilot signal to a frequency doubler and carrier frequency amplifier which collectively constitute generator 40. In either event, the output of unit 40 satisfies the frequency and phase requirements of the demodulation signal to be delivered to input circuit 21, 22.

Of course, it is also necessary to apply the composite signal to the afore-described detector channels and this is accomplished through means which apply the composite signal to such channels in push-push relation. This means is shown as a cathode follower stage having a triode 31 with a control electrode connected to the output circuit of ratio detector 13 through a coupling capacitor 32. Resistor 30 mentioned earlier is the cathode impedance of the cathode follower. In addition to supplying the composite modulation signal to the detector channels, cathode follower 31 serves concurrently to apply a forward bias to one diode of each of the channels to render that one diode continuously conductive in the absence of the demodulating signal supplied from generator 40. To that end, the control electrode of the cathode follower is also connected to a voltage dividing network of resistors 33 and 34 in series across a potential source +B to which the anode of triode 31 is also connected. The forward bias circuit may be traced from the high potential terminal of resistor 30 to the tap of inductor 21 and hence to the anode electrodes of diodes $26_a$, $26_b$. The direct current circuit required to forwardly bias the diode is continued by means including a de-emphasis filter network for deriving the A and B audio signals from the sampling capacitors. The resistive component of the de-emphasis filter of one channel comprises resistors $35_a$ and $36_a$ connected in shunt with sampling capacitor $25_a$ and defining therewith a time constant that is long relative to the charging time constant of the capacitor. It is preferred that this time constant be as long as practicable so that the sampling capacitor will have little tendency to discharge during sampling intervals. The de-emphasis network also includes a shunt capacitor $37_a$.

The de-emphasis filter of the A channel leads to an A audio amplifier $45_a$ which energizes an A speaker $46_a$ and the de-emphasis filter of the B channel energizes similar stages of audio amplification $45_b$ and a loud speaker $46_b$. The speakers are arranged in necessary spacial relation to establish a stereophonic sound pattern in the area that they serve.

In considering the operation of the receiver in response to a received frequency-modulation broadcast, it will be assumed that the received carrier signal is modulated in accordance with the modulation function of Equation 1. Where that is so, the composite signal developed in the load circuit of ratio detector 13 represents that modulation function and also has the pilot signal component S'. The pilot signal component is selected by amplifier 41 and is utilized to control generator 40 so that a demodulation signal having frequency and phase characteristics as described above is applied in push-pull relation to the two detector channels. Concurrently, the composite signal for ratio detector 13 is delivered through cathode follower 31 to these channels in push-push relation. Each pair of diodes $26_a$, $27_a$ and $26_b$, $27_b$ is rendered conductive in alternation to sample the composite signal delivered by ratio detector 13 and obtain the A and B audio signals directly for application to amplifiers $45_a$ and $45_b$ to reproduce a stereophonic program.

A more complete understanding of the derivation of the A and B audio signals can be obtained by reference to the curves of FIGURE 2. These curves represent a condition in which the A audio signal has the waveform of curve C while the waveform of the B audio signal is represented by curve D. Curve E represents the composite modulation signal, the signal of Equation 1 with the pilot term omitted for the sake of simplicity.

Curve E is the combined effect of the first two terms of Equation 1. It is the suppressed-carrier amplitude-modulated subcarrier superimposed on the sum of the A and B signals. One set of peaks of the subcarrier is a replica of the A audio signal as will be recognized by the heavy construction dots placed at each such peak as a visual aid in delineating this portion of the subcarrier. It will be observed that at the time $t_1$ the apparent phase of the subcarrier has reversed. This is characteristic of suppressed-carrier modulation because in such a modulation system the apparent phase of the carrier reverses on each occasion when the modulation signal crosses the zero axis. Indeed, phase reversal must be experienced if the carrier is to average out to zero.

One form of demodulation signal supplied from generator 40 to key the diodes so that the sampling capacitor may follow these particular peaks of the subcarrier signal is shown in curve F. It is shown as a succession of unit impulses alternating in polarity, having the same frequency as the subcarrier and occurring in time coincidence with peaks of the subcarrier. The amplitude of the demodulation signal of curve F must be large compared with the maximum amplitude of the composite signal from ratio detector 13 although it has not been convenient to show the signals to scale in the drawing. The negative portions of the demodulation signal of curve F turn on diodes $26_a$, $27_a$ simultaneously. When these diodes are thus rendered conductive, the effect is to bring the high-potential terminal of sampling capacitor $25_a$ to the potential of the ungrounded terminal of cathode resistor 30 of the cathode follower. This causes the sampling capacitor to assume a charge which represents the instantaneous potential of the peak portion of the subcarrier which is in time phase with this portion of the sampling or demodulation signal. The potential across cathode resistor 30 will, of course, vary from one sampling interval to the next in accordance with the modulation but since diodes $26_a$ and $27_a$ provide bidirectional charging paths for sampling capacitor $25_a$ having short time constants, the charge on the capacitor adjusts itself in each sampling interval accurately to reflect the instantaneous value of the sampled composite signal. The manner in which the charge condition of sampling capacitor $25_a$ varies throughout the succession of sampling intervals is shown by the broken-line curve H. It is in the nature of a step function because the capacitor cannot discharge through either diode $26_a$ or $27_a$ in the interval between samplings and the time constant of the capacitor in conjunction with resistors $35_a$ and $36_a$ is as high as practicable. The filtering effect of the de-emphasis filter wipes out the step-like characteristic of curve H and applies to audio amplifier $45_a$ a separated A audio signal corresponding to curve C.

In like fashion, the positive polarity portions of the demodulation signal of curve F control diodes $26_b$, $27_b$ to the end that they are made conductive simultaneously but at intervals midway between successive sampling intervals of diodes $26_a$, $27_a$. The conductive or sampling intervals afforded by the influence of the demodulation signal on diodes $26_b$, $27_b$ permit capacitor $25_b$ to follow the opposite peaks of the subcarrier to develop the B audio signal. In order to illustrate the sampling function of capacitor $25_b$ the composite signal has been duplicated in curve G and once again the artifice of heavy dots on the peaks of the subcarrier shows the samples taken by capacitor $25_b$. It is evident that the voltage of capacitor $25_b$ represents the B audio signal; it is smoothed by the de-emphasis network and applied to B audio amplifier $45_b$.

Thus, the described arrangement derives the A and B audio signals directly by sampling of the signal output of ratio detector 13 and no matrixing is required.

During intervals in which the receiver may accept a monophonic broadcast, the output of generator 40 is reduced to zero. This happens automaticcally if the generator is of the frequency doubler type operating on the pilot signal is explained above. With the demodulation signal reduced to zero, the D.C. potential developed across cathode resistor 30 of cathode follower 31 causes diodes $26_a$ and $26_b$ of the two detector channels to be continuously conductive, representing passive resistors. As a consequence, the output of ratio detector 13 during intervals of monophonic reception is simply the monophonic signal which is translated without modification through both detector channels to the de-emphasis filters from which it is supplied to amplifiers $45_a$ and $45_b$. These amplifiers now translate the same signal and monophonic reproduction results with both speakers $46_a$ and $46_b$ but each reproducing the same program signal. It is apparent that the receiver adjusts itself between monophonic and stereophonic reproduction in response to the character of the received signal. In the presence of the stereophonic broadcast, the forward biasing effect of cathode resistor 30 is overwhelmed by the self-biasing networks 28, 29 of the diode peak detectors.

An illustrative set of parameters for the detector channels, given solely by way of illustration rather than limitation, is as follows:

| | |
|---|---|
| Resistor **28** | 220,000 ohms. |
| Resistor **30** | 15,000 ohms. |
| Resistor **33** | 680,000 ohms. |
| Resistor **34** | 1 megohm. |
| Resistor **35** | 47,000 ohms. |
| Resistor **36** | 470,000 ohms. |
| Capacitor **22** | 62,000 micromicrofarads. |
| Capacitor **25** | 2,200 micromicrofarads. |
| Capacitor **29** | 0.047 microfard. |
| Capacitor **32** | 0.1 microfarad. |
| Capacitor **37** | 1500 micromicrofarads. |
| Diode **26** | Type ½6AL5. |
| Diode **27** | Type ½6AL5. |
| Triode **31** | Type 6C4. |
| B supply voltage | +250 volts. |
| Peak-to-peak amplitude of demodulation signal | 200 volts. |
| Maximum amplitude of the composite modulation signal | 10 volts. |
| Frequency of suppressed carrier signal | 38 kc. |

It has been convenient to use an idealized form of demodulation signal in curve F and this waveform may be closely approximated through the use of a pulse generator coupled to the detection channels by means of a pulse transformer. However, in practice it is entirely feasible that the demodulation signal be of sinusoidal waveform which, of course, is the case where that signal is derived by frequency doubling of the pilot signal component of the received carrier.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A receiver for a stereophonic frequency-modulation broadcast system for utilizing a transmitted signal comprising a carrier frequency modulated in accordance with a modulation function of the form:

$$M(t)=K_1(A+B)+K_1(A-B)S$$

where A and B are audio signals, S is the fundamental of a suppressed-carrier amplitude-modulated subcarrier signal and $K_1$ is a constant, comprising: a frequency-modulation detector; input means for applying the received signal to said detector to develop a composite signal corresponding to said modulation function; a synchronous detector including a pair of push-pull arranged channels for respectively deriving said A and B audio signals directly from said composite signal, each channel comprising a demodulation signal source, a sampling capacitor, a pair of peak detectors, means including said detectors for providing a bidirectional charging circuit for said capacitor having a time constant short compared with the conductive intervals of said peak detectors, and a conductive network in shunt with said capacitor defining therewith a time constant that is long relative to said charging time constant; means for controlling said source to supply a demodulation signal having a frequency corresponding to the fundamental of said subcarrier signal, having peak portions occurring in time phase with peaks of said subcarrier signal and having an amplitude large compared with the amplitude of said composite signal; means for applying said composite signal to said channels in push-push relation; and means for deriving said A and B audio signals from said sampling capacitors of said channels, respectively.

2. A receiver for a sterophonic frequency-modulation broadcast system for utilizing a transmitted signal comprising a carrier frequency modulated in accordance with a modulation function of the form:

$$M(t)=K_1(A+B)+K_1(A-B)S$$

where A and B are audio signals, S is the fundamental of a suppressed-carrier amplitude-modulated subcarrier signal and $K_1$ is a constant, comprising: a frequency modulation detector; input means for applying the received signal to said detector to develop a composite signal corresponding to said modulation function; a synchronous detector including a pair of push-pull arranged channels for respectively deriving said A and B audio signals directly from said composite signal, each channel comprising an input circuit resonant at the frequency of said subcarrier signal, a sampling capacitor, a pair of peak detectors connected with opposed polarity to one terminal of said capacitor and respectively connecting said capacitors to opposite terminals of said input circuit, means including said detectors for providing a bidirectional charging circuit for said capacitor having a time constant short compared with the conductive intervals of said peak detectors, and a conductive network in shunt with said capacitor defining therewith a time constant that is long relative to said charging time constant; means for applying to said input circuit a demodulation signal having a frequency corresponding to the fundamental of said subcarrier signal, having peak portions occurring in time phase with peaks of said subcarrier signal and having an amplitude large compared with the amplitude of said composite signal; means for applying said composite signal to said channels in push-push relation; and means for deriving said A and B audio signals from said sampling capacitors of said channels, respectively.

3. A receiver for a stereophonic frequency modulation broadcast system for utilizing a transmitted signal comprising a carrier frequency modulated in accordance with a modulation function of the form:

$$M(t)=K_1(A+B)+K_1(A-B)S$$

where A and B are audio signals, S is the fundamental of a suppressed-carrier amplitude-modulated subcarrier signal and $K_1$ is a constant, comprising: a frequency modulation detector; input means for applying the received signal to said detector to develop a composite signal corresponding to said modulation function; a synchronous detector including a pair of push-pull arranged channels for respectively deriving said A and B audio signals directly from said composite signal, each channel comprising an input circuit resonant at the frequency of said subcarrier signal, a sampling capacitor, a pair of diode peak detectors connected with opposed polarity to one terminal of said capacitor and respectively connecting said capacitor to opposite terminals of said input circuit, means including said detectors for providing a bidirectional charging circuit for said capacitor having a time constant short compared with the conductive intervals of said peak detectors, and a conductive network in shunt with said capacitor defining therewith a time constant that is long relative to said charging time constant; means for applying to said input circuit a demodulation signal having a frequency corresponding to the fundamental of said subcarrier signal, having peak portions occurring in time phase with peaks of said subcarrier signal and having an amplitude large compared with the amplitude of said composite signal; means for applying said composite signal to said channels in push-push relation; and means for deriving said A and B audio signals from said sampling capacitors of said channels, respectively.

4. A receiver for a stereophonic frequency modulation broadcast system for utilizing a transmitted signal comprising a carrier frequency modulated in accordince with a modulation function of the form:

$$M(t)=K_1(A+B)+K_1(A-B)S$$

where A and B are audio signals, S is the fundamental of a suppressed-carrier amplitude-modulated subcarrier signal and $K_1$ is a constant, comprising: a frequency modulation detector; input means for applying the received signal to said detector to develop a composite signal corresponding to said modulation function; a synchronous detector including a pair of push-pull arranged channels for respectively deriving said A and B audio signals directly from said composite signal, each channel comprising an input circuit resonant at the frequency of said subcarrier signal, a sampling capacitor, a pair of diode peak detectors connected with opposed polarity to one terminal of said capacitor and respectively connecting said capacitor to opposite terminals of said input circuit, means including said detectors for providing a bidirectional charging circuit for said capacitor having a time constant short compared with the conductive intervals of said peak detectors, and a conductive network in shunt with said capacitor defining therewith a time constant that is long relative to said charging time constant; means for applying to said input circuit a demodulation signal having a frequency corresponding to the fundamental of said subcarrier signal, having peak portions occurring in time phase with peaks of said subcarrier signal and having an amplitude large compared with the amplitude of said composite signal; means for applying said composite signal to said channels in push-push relation; and means comprising de-emphasis filter networks for deriving said A and B audio signals from said sampling capacitors of said channels, respectively.

5. A receiver for a stereophonic frequency modulation broadcast system for utilizing a transmitted signal comprising a carrier frequency modulated in accordance with a modulation function of the form:

$$M(t)=K_1(A+B)+K_1(A-B)S$$

where A and B are audio signals, S is the fundamental of a suppressed-carrier amplitude-modulated subcarrier signal and $K_1$ is a constant, comprising: a frequency modulation detector; input means for applying the received signal to said detector to develop a composite signal corresponding to said modulation function; a synchronous detector including a pair of push-pull arranged channels for respectively deriving said A and B audio signals directly from said composite signal, each channel comprising a demodulation signal source, a sampling capacitor, a pair of peak detectors connected with opposed polarity to one terminal of said capacitor and respectively connecting said capacitor to opposite terminals of said source, means including said detectors for providing a bidirectional charging circuit for said capacitor having a time constant short compared with the conductive intervals of said peak detectors, and a conductive network in shunt with said capacitor defining therewith a time constant that is long relative to said charging time constant; means for controlling said source to supply a demodulation signal having a frequency corresponding to the fundamental of said subcarrier signal, having peak portions occurring in time phase with peaks of said subcarrier signal and having an amplitude large compared with the amplitude of said composite signal; means for applying said composite signal to said channels in push-push relation and for concurrently applying a forward bias to one detector in each of said channels to render said one detector continuously conductive in the absence of said demodulating signal; and means for deriving said A and B audio signals from said sampling capacitors of said channels, respectively.

6. A receiver for a stereophonic frequency modulation broadcast system for utilizing a transmitted signal comprising a carrier frequency modulated in accordance with à modulation function of the form:

$$M(t)=K_1(A+B)+K_1(A-B)S$$

where A and B are audio signals, S is the fundamental of a suppressed-carrier amplitude-modulated subcarrier signal and $K_1$ is a constant, comprising: a frequency modulation detector; input means for applying the received signal to said detector to develop a composite signal corresponding to said modulation function; a synchronous detector including a pair of push-pull arranged channels for respectively deriving said A and B audio signals directly from said composite signal, each channel comprising a demodulation signal source, a sampling capacitor, a pair of diode peak detectors connected with opposed polarity to one terminal of said capacitor and respectively connecting said capacitor to opposite terminals of said source, means including said detectors for providing a bidirectional charging circuit for said capacitor having a time constant short compared with the conductive intervals of said peak detectors, and a conductive network in shunt with said capacitor defining therewith a time constant that is long relative to said charging time constant; means for controlling said source to supply a demodulation signal having a frequency corresponding to the fundamental of said subcarrier signal, having peak portions occurring in time phase with peaks of said subcarrier signal and having an amplitude large compared with the amplitude of said composite signal; a cathode follower stage coupled between said frequency modulation detector and said input circuit of said channels for applying said composite signal to said channels in push-push relation and for concurrently applying a forward bias to one detector in each of said channels to render said one detector continuously conductive in the absence of said demodulating signal; and means for deriving said A and B audio signals from said sampling capacitors of said channels, respectively.

7. A receiver for a stereophonic frequency modulation broadcast system for utilizing a transmitted signal comprising a carrier frequency modulated in accordance with a modulation function of the form:

$$M(t)=K_1(A+B)+K_1(A-B)S+K_2S'$$

where A and B are audio signals, S is the fundamental of a suppressed-carrier amplitude-modulated subcarrier signal, S' is a pilot signal related in frequency and fixed in phase relative to the frequency of said subcarrier signal and $K_1$–$K_2$ are constants, comprising: a frequency modulation detector; input means for applying the received signal to said detector to develop a composite signal corresponding to said modulation function; a synchronous detector including a pair of push-pull arranged channels for respectively deriving said A and B signals directly from said composite signal, each channel comprising a demodulation signal source, a sampling capacitor, a pair of peak detectors connected with opposed polarity to one terminal of said capacitor and respectively connecting said capacitor to opposite terminals of said source, means including said detectors for providing a bidirectional charging circuit for said capacitor having a time constant short compared with the conductive intervals of said peak detectors, and a conductive network in shunt with said capacitor defining therewith a time constant that is long relative to said charging time constant; means responsive to said pilot signal for controlling said source to supply a demodulation signal having a frequency corresponding to the fundamental of said subcarrier signal, having peak portions occurring in time phase with peaks of said subcarrier signal and having an amplitude large compared with the amplitude of said composite signal; means for applying said composite signal to said channels in push-push relation; and means for deriving said A and B audio signals from said sampling capacitors of said channels, respectively.

8. A receiver for a stereophonic frequency modulation broadcast system for utilizing a transmitted signal comprising a carrier frequency modulated in accordance with a modulation function of the form:

$$M(t)=K_1(A+B)+K_1(A-B)S+K_2S'$$

where A and B are audio signals, S is the fundamental of a suppressed-carrier amplitude-modulated subcarrier signal, S' is a pilot signal of half the frequency but fixed in phase relative to said subcarrier signal and $K_1$–$K_2$ are constants, comprising: a frequency modulation detector; input means for applying the received signal to said detector to develop a composite signal corresponding to said modulation function; a synchronous detector including a pair of push-pull arranged channels for respectively deriving said A and B signals directly from said composite signal, each channel comprising an input circuit resonant at the frequency of said subcarrier signal, a sampling capacitor, a pair of peak detectors connected with opposed polarity to one terminal of said capacitor and respectively connecting said capacitor to opposite terminals of said input circuit, means including said detectors for providing a bidirectional charging circuit for said capacitor having a time constant short compared with the conductive intervals of said peak detectors, and a conductive network in shunt with said capacitor defining therewith a time constant that is long relative to said charging time constant; means, including a frequency doubler responsive to said pilot signal, for applying to said input circuit a demodulation signal having a frequency corresponding to the fundamental of said subcarrier signal, having peak portions occurring in time phase with peaks of said subcarrier signal and having an amplitude large compared with the amplitude of said composite signal; means for applying said composite signal to said channels in push-push relation; and means for deriving said A and B audio signals from said sampling capacitors of said channels, respectively.

9. A receiver for a stereophonic frequency-modulation broadcast system for utilizing a transmitted signal comprising a carrier frequency modulated in accordance with a modulation function of the form:

$$M(t)=K_1(A+B)+K_1(A-B)S$$

where A and B are audio signals, S is the fundamental of a suppressed-carrier amplitude-modulated subcarrier signal and $K_1$ is a constant, comprising: a frequency-modulation detector; input means for applying the received signal to said detector to develop a composite signal corresponding to said modulation function; a synchronous detector including a pair of push-pull arranged channels for respectively deriving said A and B audio signals directly from said composite signal, each channel comprising a demodulation signal source, a sampling capacitor, a pair of peak detectors connected with opposed polarity to one terminal of said capacitor and respectively connecting said capacitor to opposite terminals of said source, means including said detectors for providing a bidirectional charging circuit for said capacitor having a time constant short compared with the conductive intervals of said peak detectors, and a conductive network in shunt with said capacitor defining therewith a time constant that is long relative to said charging time constant; means for controlling said source to supply a demodulation signal having a frequency corresponding to the fundamental of said subcarrier signal, having peak portions occurring in time phase with peaks of said subcarrier signal and having an amplitude large compared with the amplitude of said composite signal; means for applying said composite signal to said channels in push-push relation; and means for deriving said A and B audio signals from said sampling capacitors of said channels, respectively.

No references cited.